(12) United States Patent
Zhuang et al.

(10) Patent No.: US 9,485,662 B2
(45) Date of Patent: *Nov. 1, 2016

(54) METHOD, SYSTEM AND DEVICE FOR DISTRIBUTING RESOURCE OF BASE STATION NODE

(71) Applicant: Huawei Technologies Co., Ltd., Shenzhen, Guangdong (CN)

(72) Inventors: Hongcheng Zhuang, Shenzhen (CN); Jianzhi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

This patent is subject to a terminal disclaimer.

(21) Appl. No.: 13/954,637

(22) Filed: Jul. 30, 2013

(65) Prior Publication Data

US 2014/0056240 A1  Feb. 27, 2014

Related U.S. Application Data

(63) Continuation of application No. 12/110,521, filed on Apr. 28, 2008, now Pat. No. 8,526,370, which is a continuation of application No. PCT/CN2007/000165, filed on Jan. 17, 2007.

(30) Foreign Application Priority Data

Jan. 19, 2006 (CN) .......................... 2006 1 0003809

(51) Int. Cl.
*H04W 16/04* (2009.01)
*H04W 76/02* (2009.01)
(Continued)

(52) U.S. Cl.
CPC ............ *H04W 16/04* (2013.01); *H04L 5/0037* (2013.01); *H04W 52/0206* (2013.01);
(Continued)

(58) Field of Classification Search
CPC .................. H04W 8/22–8/245; H04W 28/16; H04W 28/18; H04L 29/06537; H04L 69/24
See application file for complete search history.

(56) References Cited

U.S. PATENT DOCUMENTS 6,738,624 B1  5/2004  Aksentijevic et al.
8,526,370 B2  9/2013  Zhang et al.
(Continued)

FOREIGN PATENT DOCUMENTS

CN  1658542 A  8/2005
CN  1722859 A  1/2006
(Continued)

OTHER PUBLICATIONS $3^{rd}$ Generation Partnership Project, "Technical Specification Group Radio Access Network; UTRAN Lub Interface Node B Application Part (NBAP) Signalling (Release 6)," 1-747(Dec. 2005).
(Continued)

*Primary Examiner* — Hoon J Chung
(74) *Attorney, Agent, or Firm* — Leydig, Voit & Mayer, Ltd.

(57) ABSTRACT

A method, system and device for allocating resources of a base station node (Node B) are disclosed to enable F-DPCH resources of a local cell to be sufficiently used. In this invention, Node B reports to the RNC the F-DPCH capability of the local cell so as to provide a decision-making basis about using or not using the F-DPCH to the RNC. If the local cell supports F-DPCH, when the UE initiates an RRC connection establishment request, the RNC instructs the Node B to allocate the F-DPCH and HSDPA resources to the UE, otherwise the RNC instructs the Node B to allocate DPDCH and DPDCCH resources to the UE. The F-DPCH capability of the local cell can be reported in a newly added IE or extended existing IE of the Audit Response message and Resource Status Indication message.

20 Claims, 4 Drawing Sheets

(51) Int. Cl.
*H04L 5/00* (2006.01)
*H04W 52/02* (2009.01)
*H04W 28/16* (2009.01)
*H04W 72/04* (2009.01)
*H04W 88/02* (2009.01)
*H04W 88/08* (2009.01)
*H04W 88/12* (2009.01)

(52) U.S. Cl.
CPC ......... *H04W 72/042* (2013.01); *H04W 76/02* (2013.01); *H04L 5/0042* (2013.01); *H04L 5/0091* (2013.01); *H04W 28/16* (2013.01); *H04W 72/0433* (2013.01); *H04W 88/02* (2013.01); *H04W 88/08* (2013.01); *H04W 88/12* (2013.01)

(56) References Cited

U.S. PATENT DOCUMENTS

| | | |
|---|---|---|
| 2004/0192326 A1 | 9/2004 | Stern-Berkowitz et al. |
| 2005/0233734 A1 | 10/2005 | Rajkotia et al. |
| 2007/0104167 A1 | 5/2007 | Nakamata et al. |
| 2007/0178902 A1 | 8/2007 | Guethaus et al. |
| 2008/0049683 A1 | 2/2008 | Nakamata et al. |
| 2008/0182594 A1* | 7/2008 | Flore et al. ............ 455/458 |
| 2014/0056240 A1 | 2/2014 | Zhuang |

FOREIGN PATENT DOCUMENTS

| | | |
|---|---|---|
| CN | 1722860 A | 1/2006 |
| CN | 1917661 A | 2/2007 |
| EP | 2456273 A1 | 5/2012 |
| GB | 2371183 A | 7/2002 |
| WO | WO 2005/094100 A1 | 10/2005 |
| WO | WO 2006/005240 A1 | 1/2006 |

OTHER PUBLICATIONS

"Universal Mobile Telecommunications System (UMTS); UTRAN Iub Interface Node B, Application Part (NBAP) signaling (3GPP TS 25.433 version 6.8.0 Release 6); ETSI TS 125 433," ETSI Standards, 3-R3(V6.8.0): 1-67 (Dec. 2005).
Written Opinion of the International Searching Authority in corresponding PCT Application No. PCT/CN2007/000165 (Apr. 26, 2007).
1$^{st}$ Office Action in corresponding European Application No. 07702097.2 (Feb. 17, 2010).
2$^{nd}$ Office Action in corresponding European Application No. 07702097.2 (Oct. 6, 2010).
"3GPP TS 25.433—Radio Link Setup," Dec. 2005, Version 6.8.0, 3$^{rd}$ Generation Partnership Project, Valbonne, France.
"3GPP TS 25.306—Technical Specification Group Radio Access Network; UE Radio Access capabilities (Release 6)," Dec. 2005, Version 6.7.0, 3$^{rd}$ Generation Partnership Project, Valbonne, France.
"3GPP TS 25.331—Radio Resource Control (RRC); Protocol specification," Dec. 2005, Version 6.8.0, 3$^{rd}$ Generation Partnership Project, Valbonne, France.
Reasons for Rejection in corresponding Office Action in corresponding Japanese Application No. 2008-550615 (Mar. 23, 2011).
Reasons for Rejection in corresponding Office Action in corresponding Japanese Application No. 2008-550615 (Jul. 22, 2011).
"R3-060314-F-DPCH Cell Capability Enhancement," 3GPP TSG-RAN3 Meeting #51, Feb. 13-17, 2006, 3$^{rd}$ Generation Partnership Project, Denver, Colorado.
International Search Report in corresponding PCT Application No. PCT/CN2007/000165 (Apr. 26, 2007).
3$^{rd}$ Office Action in corresponding European Application No. 07702097.2 (Jul. 22, 2011).
4$^{th}$ Office Action in corresponding European Application No. 07702097.2 (Mar. 27, 2012).
Extended European Search Report in European Application No. 12155259.0 (Mar. 28, 2012).
3$^{rd}$ Generation Partnership Program (3GPP), Huawei, "F-DPCH Cell Capability Enhancement," 3GPP TSG-RAN3 Meeting #51, Change Request, Tdoc R3-060113, Denver, U.S.A. (Feb. 13-17, 2006).
5$^{th}$ Office Action in corresponding European Patent Application No. 07702097.2 (Apr. 23, 2012).
1$^{st}$ Office Action in corresponding European Patent Application No. 12155259.0 (Jan. 23, 2013).
1$^{st}$ Office Action in corresponding U.S. Appl. No. 15/013,672 (Jun. 30, 2016).

* cited by examiner

METHOD, SYSTEM AND DEVICE FOR DISTRIBUTING RESOURCE OF BASE STATION NODE

CROSS-REFERENCE TO RELATED APPLICATIONS

This application is a continuation of U.S. patent application Ser. No. 12/110,521, filed Apr. 28, 2008, which is a continuation of International Patent Application No. PCT/CN2007/000165, filed Jan. 17, 2007, entitled Method for Distributing Resources of Base Station Node," which claims priority to Chinese Patent Application No. 200610003809.5, filed on Jan. 19, 2006, also entitled "Method for Distributing Resources of Base Station Node" the entire disclosures of which are hereby incorporated by reference in their entireties.

FIELD OF THE INVENTION

The present invention relates to mobile communication technology, and particularly relates to a method and a device for allocating resources of a mobile communication system and a base station node thereof.

BACKGROUND OF THE INVENTION

Both High Speed Downlink Packet Access (HSDPA) technology and High Speed Uplink Packet Access (HSUPA) technology are important evolutions of the Third Generation (3G) mobile communication technology. Data packet scheduling, retransmitting, etc. of HSDPA and HSUPA are controlled by a base station node (Node B hereafter). This kind of control has higher speed and may adapt to channel changes better, reduce transmission delay and increase data throughput.

Two downlink physical channels and one uplink physical channel are newly added in the HSDPA technology for high-speed transmission of data of a User Equipment (UE), which are respectively a High Speed Physical Downlink Shared Channel (HS-PDSCH) for bearing downlink user data, a High Speed Shared Control Channel (HS-SCCH) for bearing downlink control information and a High Speed Dedicated Physical Control Channel (HS-DPCCH) for bearing uplink feedback information of the UE. The base station gets information through the HS-DPCCH about whether the data is correctly received, and if not, initiates retransmission; otherwise, transmits new data.

As a special downlink dedicated channel, a Fractional-Dedicated Physical Channel (F-DPCH) combined with the HSDPA technique may replace a downlink Dedicated Physical Data Channel (DPDCH)/Dedicated Physical Control Channel (DPCCH) to effectively improve the utilization efficiency of a downlink channelization code, and has been introduced in the prior art. Thus, when a subscriber conducts Packet Switch (PS) domain related services, such as Voice over IP (VoIP), the F-DPCH may be used in cooperation with the HSDPA on the downlink to map the Signaling Radio Bearing (SRB) to the HSDPA without the need of allocating a separated downlink dedicated physical channel resource, thereby improving the downlink capacity and utilization efficiency of the downlink channelization code of the system.

The definition of the capability of a UE for supporting the F-DPCH is expressed by an Information Element (IE) supporting the HS-PDSCH: if the UE supports the HS-PDSCH, it must support the F-DPCH too. However, as it is not defined in the capability set of a local cell of the Node B whether the local cell supports the F-DPCH, the Controlling Radio Network Controller (CRNC) is not able to know whether the local cell of the Node B supports the F-DPCH.

As shown in FIG. 1, a method for allocating resources of a Node B includes the following processes. In process 101, a Serving Radio Network Controller (SRNC)/CRNC transmits an Audit Request message to the Node B. In process 102, the Node B returns an Audit Response message. In process 103, the SRNC/CRNC is not able to know whether the local cell supports the F-DPCH on receiving the response message. In process 104, a cell is established on the local cell. In process 105, a UE in the cell which uses the services provided by the local cell requests establishment of a Radio Resource Control (RRC) connection, i.e. establishment of a signaling connection in the PS domain. In process 106, the SRNC/CRNC instructs the Node B to allocate a DPDCH and a DPCCH for the UE to bear the data and signaling of the UE. The SRNC/CRNC transmits a Radio Link Setup Request message to the Node B according to the allocation instruction. No F-DPCH information is carried in the request message.

Therefore, the F-DPCH is not used with the Radio Resource Control (RRC) connection established between the RNC and the UE. In practical applications, the above-mentioned solution has the disadvantage that F-DPCH resources are not sufficiently used.

A major reason for the problem is that the RNC is not able to obtain the F-DPCH capability information of the Node B, which makes the RNC not capable of dynamically adjusting strategy of allocating F-DPCH resources, and thus F-DPCH resources cannot be sufficiently used.

SUMMARY OF THE INVENTION

According to embodiments of the present invention, a method, a system and a device are provided for allocating resources of a Node B, by which F-DPCH resources of a local cell can be used sufficiently.

A method for allocating resources of a Node B according to an embodiment of the present invention includes: reporting, by the Node B, to the RNC the F-DPCH capability information of the local cell pertained to the Node B; making, by the RNC, a decision on allocation of resources of the Node B according to the information reported by the Node B, and transmitting a resource allocation instruction to the Node B according to the decision; and allocating, by the Node B, the resources according to the resource allocation instruction.

Another embodiment of the present invention provides a Node B including: a Capability Information Reporting Unit for reporting F-DPCH capability information of a local cell to an RNC; an Allocation Instruction Receiving Unit for receiving a resource allocation instruction transmitted from the RNC according to F-DPCH capability information reported by the Capability Information Reporting Unit; and a Resource Allocating Unit for allocating resources according to the resource allocation instruction received by the Allocation Instruction Receiving Unit.

Yet another embodiment of the present invention provides a Radio Network Controller including: a Capability Information Obtaining Unit for obtaining F-DPCH capability information reported by a Node B; a Decision Making Unit for performing decision-making on allocation of resources of the Node B according to the F-DPCH capability information obtained by the Capability Information Obtaining Unit; and an Allocation Instruction Transmitting Unit for transmitting a resource allocation instruction to the Node B according to the decision made by the Decision Making Unit.

Yet another embodiment of the present invention provides a mobile communication system including a Node B and an RNC; the Node B is adapted to report F-DPCH capability information of a local cell to the RNC, receive resource allocation instructions from the RNC and allocate resources according to the instruction; the RNC is adapted to obtain the reported F-DPCH capability information, perform decision-making on resource allocation of the Node B according to the capability information and transmit resource allocation instructions to the Node B.

In the embodiments of the present invention, the Node B reports F-DPCH capability of a local cell to the RNC, which provides a decision-making basis for the RNC to determine whether to use an F-DPCH. The RNC is able to know the F-DPCH capability of the local cell of the Node B accurately based on the reported F-DPCH capability information of the local cell, which facilitates the decision-making of the RNC on use of F-DPCH resources, thereby utilizing the combination of F-DPCH and HSDPA sufficiently to improve the downlink capacity and utilization efficiency of the downlink channelization code of the system.

DETAILED DESCRIPTION OF THE EMBODIMENTS

The present invention will now be further described with reference to the accompanying drawings for better understanding of the objects, technical solutions and advantages thereof.

According to embodiments of the present invention, the F-DPCH capability of a local cell of a Node B is indicated by introducing a new Information Element (IE) or extending an original IE in the capability set of local cells of the Node B Application Part (NBAP) protocol, thereby providing a decision-making basis for the RNC to determine whether to use an F-DPCH.

Figure 1:
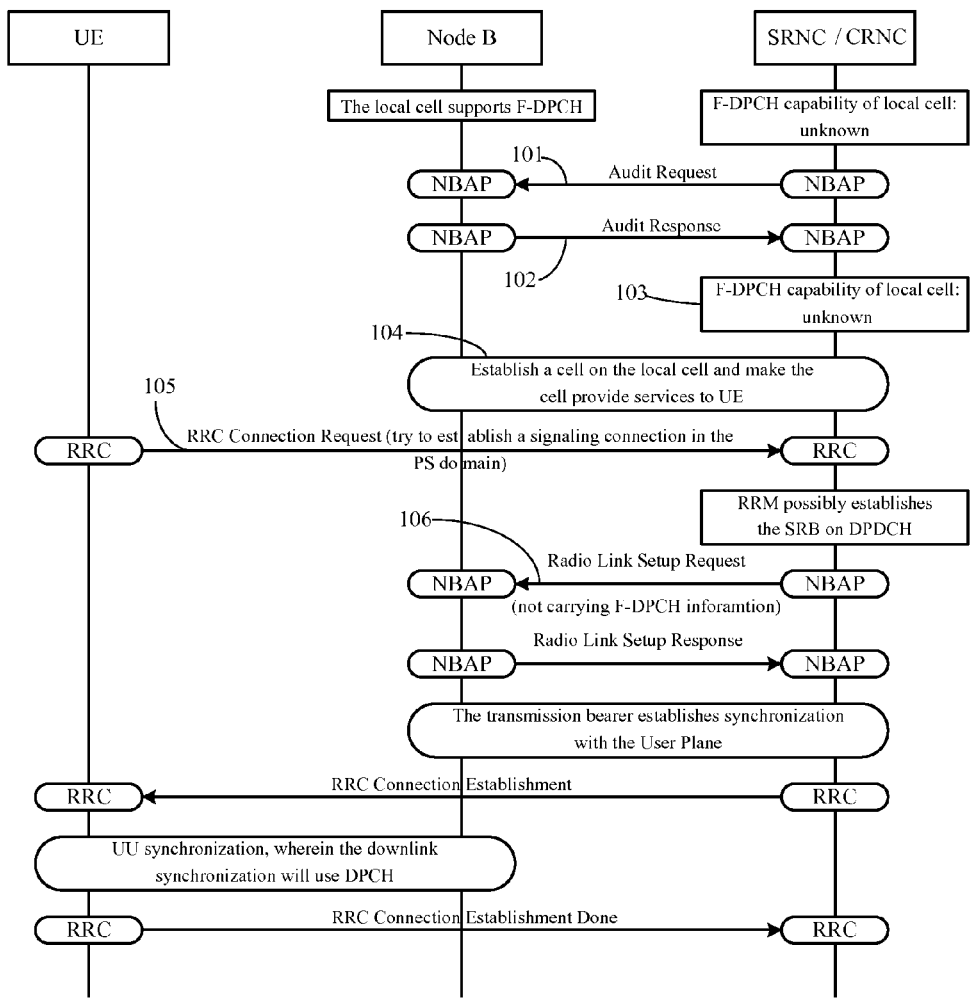
FIG. 1 is a flow chart illustrating a conventional method for allocating resources of a Node B.
Figure 2:
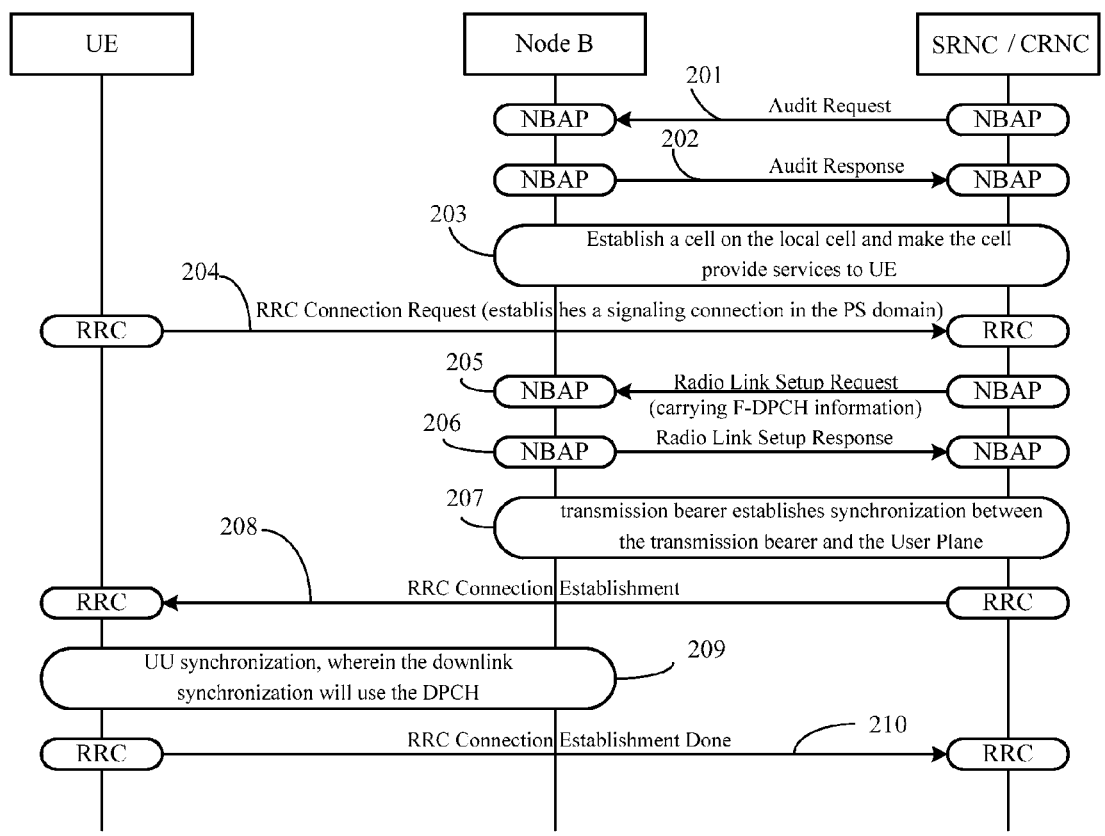
FIG. 2 is a flow chart illustrating a method for allocating resources of a Node B according to a first embodiment of the present invention.

A method for allocating resources of a Node B according to a first embodiment of the present invention is shown in FIG. 2, wherein the RNC performs decision-making on resource allocating according to the F-DPCH capability information audited and reported by the Node B.

In process 201, the SRNC/CRNC transmits an Audit Request message to the Node B.

In process 202, the Node B returns an Audit Response message reporting information about whether a local cell belonging to the Node B supports F-DPCH in this message according to newly added IE information in the capability set of the local cell belonging to the Node B.

The newly added IE information is added in Local Cell Information which is a part of the Audit Response message. The newly added IE may be referred to as "F-DPCH Capability (Fractional-Dedicated Physical Channel Capability)", an implementation form of which is shown in Table 1. Definition of headings of Table 1 and description about IEs except for "F-DPCH Capability" as shown in Table 1 both can be found in specification 3GPP TS 25.433 V6.8.0 established and maintained by The 3rd Generation Partnership Project (3GPP). The specification is hereby incorporated by reference in its entirety and for everything it describes.

TABLE 1

| Information Element/Group name | Presence | Range | Type and reference | Semantics description | Criticality | Assigned Criticality |
|---|---|---|---|---|---|---|
| The above parts of Audit Response message are omitted |||||||
| Local Cell Information | | 0..<maxLocal CellIn NodeB> | | | EACH | Ignore |
| >Local Cell ID | M | | 9.2.1.38 | | — | |
| >DL Or Global Capacity Credit | M | | 9.2.1.20B | | — | |
| >UL Capacity Credit | O | | 9.2.1.65A | | — | |
| >Common Channels Capacity Consumption Law | M | | 9.2.1.9A | | — | |
| >Dedicated Channels Capacity Consumption Law | M | | 9.2.1.20A | | — | |
| >Maximum DL Power Capability | O | | 9.2.1.39 | | — | |
| >Minimum Spreading Factor | O | | 9.2.1.47 | | — | |
| >Minimum DL Power Capability | O | | 9.2.1.46A | | — | |
| >Local Cell Group ID | O | | 9.2.1.37A | | — | |
| >Reference Clock Availability | O | | 9.2.3.14A | TDD only | YES | Ignore |

TABLE 1-continued

| Information Element/Group name | Presence | Range | Type and reference | Semantics description | Criticality | Assigned Criticality |
|---|---|---|---|---|---|---|
| >Power Local Cell Group ID | O | | 9.2.1.49B | | YES | Ignore |
| >HSDPA Capability | O | | 9.2.1.31Ga | | YES | Ignore |
| >E-DCH Capability | O | | 9.2.2.13J | | YES | Ignore |
| >E-DCH TTI2ms Capability | C-EDCH Capability | | 9.2.2.13V | | YES | Ignore |
| >E-DCH SF Capability | C-EDCH Capability | | 9.2.2.13W | | YES | Ignore |
| >F-DPCH Capability | O | | 9.#.#.# | | YES | Ignore |

The following parts of Audit Response message are omitted

Wherein M means Mandatory, O means Optional, C means Conditional, and EDCH means Enhanced Dedicated Channel, DL means downlink, UL means uplink, SF means spread factor.

In an embodiment of the present invention, the specific definition of the IE "F-DPCH Capability" can be as shown in Table 2. Definition of headings of Table 2 can be found in specification 3GPP TS 25.433 V6.8.0.

TABLE 2

| IE/Group Name | Presence | Range | IE Type and Reference | Semantics Description |
|---|---|---|---|---|
| F-DPCH Capability | O | | ENUMERATED (F-DPCH Capable, F-DPCH non Capable) | |

In process 203, on receiving the response message, the SRNC/CRNC knows that the local cell supports F-DPCH according to the newly added IE information and establishes a cell on the local cell.

In process 204, the UE in the cell (which uses services provided by the local cell) requests establishment of an RRC connection, i.e. establish a signaling connection in the PS domain.

In process 205, because the information reported by the Node B shows that the local cell supports F-DPCH, on receiving the RRC Connection Establishing Request initiated by the UE, the SRNC/CRNC instructs the Node B to allocate F-DPCH and HSDPA channel resources for the UE to bear the signaling and data of the UE.

The SRNC/CRNC transmits a Radio Link Setup Request message to the Node B according to the allocation instruction, and the F-DPCH information is carried in the Radio Link Setup Request message.

In process 206, the Node B returns a Radio Link Setup Response message.

In process 207, the transmission bearer between the Node B and SRNC/CRNC is synchronized with the User Plane.

In process 208, the SRNC/CRNC transmits an RRC Connection Establishing message to the UE.

In process 209, a UU (an interface between the RNC and the UE) is synchronized, wherein the F-DPCH will be used in the downlink synchronization.

In process 210, the UE returns an RRC Connection Establishing Done message.

According to the above described auditing and reporting method, those skilled in the art should appreciate that the RNC may know the F-DPCH capability of the local cell of the Node B accurately by periodically auditing and reporting the real-time F-DPCH capability information of the local cell, which facilitates the decision-making of the RNC on using F-DPCH resources, thereby sufficiently utilizing the combination of F-DPCH and HSDPA to improve the downlink capacity and utilization efficiency of the downlink channelization code of the system.

In addition, it should be explained that if the local cell does not support F-DPCH, the SRNC/CRNC may use the method of the prior art to allocate resources, for example, the SRNC/CRNC may instruct the Node B to allocate DPDCH and DPCCH for the UE to bear the signaling and data of the UE.

Figure 3:
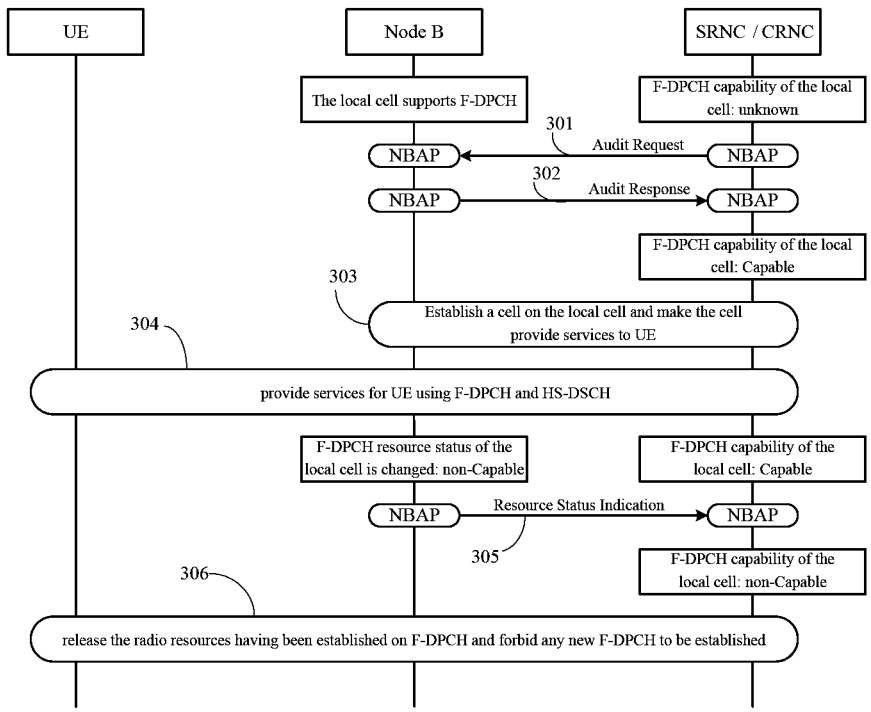
FIG. 3 is a flow chart illustrating a method for allocating resources of a Node B according to a second embodiment of the present invention.

A method for allocating resources of the Node B according to a second embodiment of the present invention is shown in FIG. 3. Besides obtaining real-time F-DPCH capability information of the local cell according to the above described periodically auditing and reporting method, it is also possible to obtain F-DPCH capability information of the local cell by reporting the change information using a Resource Status Indication message when the resource status of the local cell is changed.

In process 301, no F-DPCH capability information of the local cell presents in the SRNC/CRNC, and the SRNC/CRNC transmits an Audit Request message to the Node B.

Process 302 is similar to process 202, the Node B reports the capability information to the SRNC/CRNC using an Audit Response message that, for example, the local cell supports F-DPCH.

Process 303 is similar to process 203, the SRNC/CRNC knows based on the Audit Response message that F-DPCH capability of the local cell is "Capable", and establishes a cell on the local cell.

In process 304, through the F-DPCH and HS-DSCH, the UE uses services provided by the cell that is provided with services by the local cell.

In process 305, once the resource status of the local cell is changed, for example, the F-DPCH capability of the local cell is changed from "Capable" to "non-Capable" due to a single board fault, the Node B reports the change information to the SRNC/CRNC by means of a "Resource Status Indication" message.

In the second embodiment of the present invention, taking as an example that the F-DPCH capability of the local cell changes from "Capable" to "non-Capable", the changed F-DPCH capability information (non-Capable) may be carried in the "Resource Status Indication" message as shown in Table 3. Definition of headings of Table 3 and description about IEs except for "F-DPCH Capability" as shown in Table 3 both can be found in specification 3GPP TS 25.433 V6.8.0.

TABLE 3

| Information Elemnt/Group name | Presence | Range | Type and reference | Semantics description | Criticality | Assigned Criticality |
|---|---|---|---|---|---|---|
| The above parts of Resource Status Indication are omitted | | | | | | |
| >No Failure | | | | | | |
| >>Local Cell Information | | 1..<max LocalCellin NodeB> | | | EACH | Ignore |
| >>>Local Cell ID | M | | 9.2.1.38 | | — | |
| >>>Add/Delete Indicator | M | | 9.2.1.1 | | — | |
| >>>DL Or Global Capacity Credit | C-add | | 9.2.1.20B | | — | |
| >>>UL Capacity Credit | O | | 9.2.1.65A | | — | |
| >>>Dedicated Channels Capacity Consumption Law | C-add | | 9.2.1.20A | | — | |
| >>>Maximum DL Power Capability | C-add | | 9.2.1.39 | | — | |
| >>>Minimum Spreading Factor | C-add | | 9.2.1.47 | | — | |
| >>>Minimum DL Power Capability | C-add | | 9.2.1.46A | | — | |
| >>>Local Cell Group ID | O | | 9.2.1.37A | | — | |
| >>>Reference Clock Availability | O | | 9.2.3.14A | TDD only | YES | Ignore |
| >>>Power Local Cell Group ID | O | | 9.2.1.49B | | YES | Ignore |
| >>>HSDPA Capability | O | | 9.2.1.31Ga | | YES | Ignore |
| >>>E-DCH Capability | O | | 9.2.2.13J | | YES | Ignore |
| >>>E-DCH TTI2ms Capability | C-EDCH Capability | | 9.2.2.13V | | YES | Ignore |
| >>>E-DCH SF Capability | C-EDCH Capability | | 9.2.2.13W | | YES | Ignore |
| >>>E-DCH Capacity Consumption Law | O | | 9.2.2.13Ja | | YES | Ignore |
| >>>F-DPCH Capability | O | | 9.#.#.# | | NO | Ignore |
| The middle parts are omitted | | | | | — | |
| >Service Impacting | | | | | | |
| >>Local Cell Information | | 0..<maxLocal Cellin NodeB> | | | EACH | Ignore |
| >>>Local Cell ID | M | | 9.2.1.38 | | — | |
| >>>DL Or Global Capacity Credit | O | | 9.2.1.20B | | — | |
| >>>UL Capacity Credit | O | | 9.2.1.65A | | — | |
| >>>Common Channels Capacity Consumption Law | O | | 9.2.1.9A | | — | |
| >>>Dedicated Channels Capacity Consumption Law | O | | 9.2.1.20A | | — | |
| >>>Maximum DL Power Capability | O | | 9.2.1.39 | | — | |
| >>>Minimum Spreading Factor | O | | 9.2.1.47 | | — | |
| >>>Minimum DL Power Capability | O | | 9.2.1.46A | | — | |
| >>>Reference Clock Availability | O | | 9.2.3.14A | TDD only | YES | Ignore |
| >>>HSDPA Capability | O | | 9.2.1.31Ga | | YES | Ignore |
| >>>E-DCH Capability | O | | 9.2.2.13J | | YES | Ignore |
| >>>E-DCH TTI2ms Capability | C-EDCH Capability | | 9.2.2.13V | | YES | Ignore |
| >>>E-DCH SF Capability | C-EDCH Capability | | 9.2.2.13W | | YES | Ignore |
| >>>E-DCH Capacity Consumption Law | O | | 9.2.2.13Ja | | YES | Ignore |
| >>>F-DPCH Capability | O | | 9.#.#.# | | NO | Ignore |

The following parts of Resource Status Indication are omitted

Wherein M means Mandatory, O means Optional, C means Conditional, and EDCH means Enhanced Dedicated Channel, DL means downlink, UL means uplink, SF means spread factor.

In process 306, the SRNC/CRNC knows that the F-DPCH capability of the local cell is changed from "Capable" to "non-Capable" according to the message, which leads to an F-DPCH downlink synchronization failure, makes the SRNC/CRNC release radio resources of all UEs using the F-DPCH in the cell that uses services provided by the local cell, and forbids any new F-DPCH to be established.

Hereafter, the DPDCH/DPCCH and HSDPA will be used to support new service request of the UE.

In addition, it can be understood that some changes, for example, the F-DPCH capability being changed from "non-Capable" to "Capable" (for example, the functions of the single board being extended) and F-DPCH capability being changed from "unknown" to "known", may also be reported by means of a "Resource Status Indication" massage.

In all the above-mentioned embodiments, the F-DPCH capability information is transferred in a newly added IE. It is also possible to extend an existing IE in the "Audit Response" message or "Resource Status Indication" message, and transfer the F-DPCH capability information in the extended IE.

Figure 4:
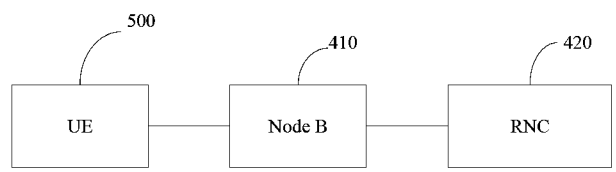
FIG. 4 is a block diagram illustrating a mobile communication system according to an embodiment of the present invention.

With reference to FIG. 4, there is shown a block diagram illustrating a mobile communication system according to an embodiment of the present invention.

The mobile communication system may provide services to a UE 500, which includes a Node B 410 and a Radio Network Controller 420.

The Node B 410 is adapted to report F-DPCH capability information of a local cell to the RNC 420, receive the resource allocation instruction from the RNC 420 and allocate resources according to the instruction.

The RNC 420 is adapted to obtain the reported F-DPCH capability information, perform decision-making on allocation of resources of the Node B 410 according to the capability information, and transmit resource allocation instruction to the Node B 410.

The decision may be made as follows: if the local cell supports F-DPCH, the RNC 420 instructs the Node B 410 to allocate F-DPCH and HSDPA channel resources for the UE 500 to bear the signaling and data upon receiving the RRC Connection Establishing Request initiated by the UE 500 in the cell that uses services provided by the local cell.

The decision-making may also be performed as follows: if the local cell belonging to the Node B 410 does not support F-DPCH, the RNC 420 instructs the Node B 410 to allocate DPDCH and DPCCH resources for the UE 500 to bear the signaling and data upon receiving the RRC Connection Establishing Request initiated by the UE 500 in the cell that uses services provided by the local cell.

In an embodiment, the Node B 410 may report F-DPCH capability information to the RNC 420 by means of a newly added IE or an extended existing IE in the capability set of the local cell to which it belongs. The F-DPCH capability information may be carried in an "Audit Response" message or "Resource Status Indication" message to be transferred to the RNC 420.

Figure 5:
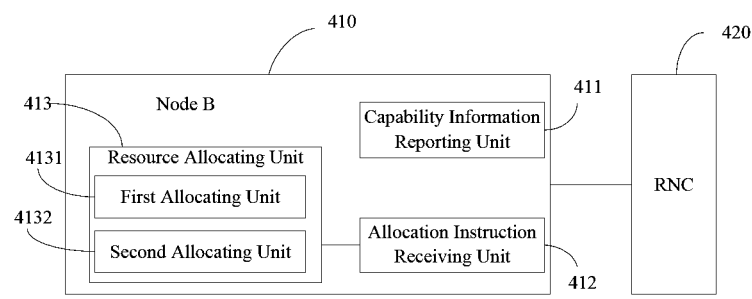
FIG. 5 is a block diagram illustrating in greater detail an embodiment of the Node B shown in FIG. 4.

With reference to FIG. 5, a block diagram illustrating the Node B according to an embodiment of the present invention is shown.

The Node B 410 includes a Capability Information Reporting Unit 411 for reporting F-DPCH capability information of the local cell to the RNC 420; an Allocation Instruction Receiving Unit 412 for receiving a resource allocation instruction transmitted from the RNC 420 according to F-DPCH capability information reported by the Capability Information Reporting Unit 411; a Resource Allocating Unit 413 for allocating the resources according to the resource allocation instruction received by the Allocation Instruction Receiving Unit 412.

The Resource Allocating Unit 413 includes a First Allocating Unit 4131 for allocating F-DPCH and HSDPA resources for a UE to bear signaling and data of the UE when the resource allocation instruction is a first instruction; a Second Allocating Unit 4132 for allocating DPDCH and DPCCH resources for an UE to bear signaling and data of the UE when the resource allocation instruction is a second instruction.

In a specific embodiment, the Capability Information Reporting Unit 411 may be an Audit Reporting Unit. In such a case, the F-DPCH capability information of the local cell shall be carried in an Audit Response message reported to the RNC 420. Alternatively, the Capability Information Reporting Unit 411 may be a Resource Status Change Notifying Unit, and F-DPCH capability information of the local cell is carried in a Resource Status Change message reported to the RNC 420.

The F-DPCH capability information may be represented by a newly added IE or an extended existing IE.

Figure 6:
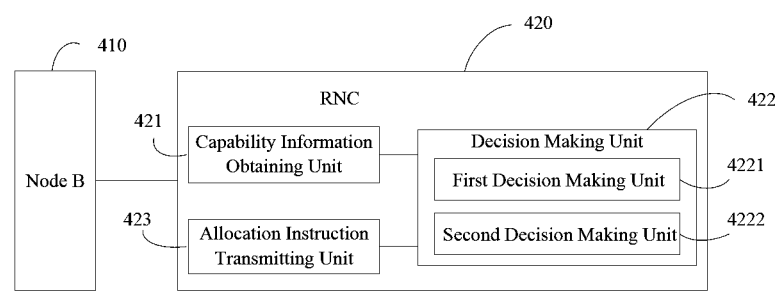
FIG. 6 is a block diagram illustrating in greater detail an embodiment of the RNC shown in FIG. 4.

With reference to FIG. 6, a block diagram illustrating the RNC according to an embodiment of the present invention is shown.

The RNC 420 includes a Capability Information Obtaining Unit 421 for obtaining F-DPCH capability information reported by the Node B 410; a Decision Making Unit 422 for performing decision-making on resource allocation of the Node B 410 according to F-DPCH capability information obtained by the Capability Information Obtaining Unit 421; an Allocation Instruction Transmitting Unit 423 for transmitting a resource allocation instruction to the Node B 410 according to the decision made by the Decision Making Unit 422.

The Decision Making Unit 422 includes a first Decision Making Unit 4221 for instructing the Node B 410 to allocate F-DPCH and HSDPA resources for an UE to bear signaling and data in response to the RRC Connection Establishing Request initiated by an UE when the reported F-DPCH capability information is "Capable".

The Decision Making Unit 422 also includes a second Decision Making Unit 4222 for instructing the Node B 410 to allocate DPDCH and DPCCH resources for the UE to bear signaling and data in response to the RRC Connection Establishing Request initiated by the UE when the reported F-DPCH capability information is "non-Capable."

In a specific embodiment, the Capability Information Obtaining Unit 421 may be an Audit Message Analyzing Unit for obtaining F-DPCH capability information of the local cell from the Audit Response message reported by the Node B 410. Alternatively, the Capability Information Obtaining Unit 421 may be a Resource Status Change Analyzing Unit for obtaining F-DPCH capability information of the local cell from the Resource Status Change message reported by Node B 410.

The F-DPCH capability information may be represented by a newly added IE or an extended existing IE.

The Allocating Instruction Transmitting Unit 423 may be a Radio Link Setup Request Unit, in such a case, the channel information corresponding to the decision is carried in the request message transmitted by the Radio Link Setup Request Unit.

While the present invention has been illustrated and described with reference to certain preferred embodiments, the present invention is not limited thereto. Those skilled in the art should recognize that variations and modifications can be made without departing from the scope of the present invention as defined by the accompanying claims.

What is claimed is:

1. A method for allocating resources of a base station node (Node B) comprising:
   reporting, by the Node B, Fractional-Dedicated Physical Channel (F-DPCH) capability information of a local cell belonging to the Node B to a Radio Network Controller (RNC);
   making, by the RNC, a decision on allocation of resources of the Node B according to the F-DPCH capability information reported by the Node B;
   transmitting, by the RNC, a radio link setup request message carrying F-DPCH information to the Node B; and
   allocating, by the Node B, the resources in accordance with the radio link setup request message for a user equipment (UE).

2. The method according to claim 1, further comprising, reporting, by the Node B, changed F-DPCH capability information to the RNC when the F-DPCH capability information of the local cell is changed.

3. The method according to claim 2, wherein the changed F-DPCH capability information is reported by the Node B through a "Resource Status Indication" message.

4. The method according to claim 1, wherein the RNC sends the radio link setup request message to the Node B on receiving a radio resource control (RRC) connection establishing request message initiated by the UE.

5. The method according to claim 1, wherein the allocating, by the Node B, resources in accordance with the radio link setup request message for the UE comprises:
   allocating, by the Node B, F-DPCH and high speed downlink packet access (HSDPA) resource for the UE.

6. The method according to claim 1, wherein the making a decision on allocation of resources of the Node B comprises:
   instructing, by the RNC, the Node B to allocate F-DPCH and HSDPA resources for a User Equipment in a cell that uses services provided by the local cell on receiving a RRC connection establishing request initiated by the UE if the local cell supports F-DPCH.

7. The method according to claim 1, wherein the making a decision on allocation of resources of the Node B comprises:
   instructing, by the RNC, the Node B to allocate Dedicated Physical Data Channel (DPDCH) and Dedicated Physical Control Channel (DPCCH) resources for the UE in the cell that uses services provided by the local cell on receiving the RRC connection establishing request initiated by the UE if the local cell does not support F-DPCH.

8. The method according to claim 1, wherein the reporting the F-DPCH capability information of the local cell belonging to the Node B to the RNC comprises:
   reporting, by the Node B, the F-DPCH capability information of the local cell on receiving an audit message from the RNC.

9. The method according to claim 1, wherein the F-DPCH capability information of the local cell is reported through an "Audit Response" message.

10. The method according to claim 1, further comprising:
    sending, by the Node B, a radio link setup response message to the RNC; and
    obtaining, by the Node B, a downlink synchronization by using F-DPCH.

11. A base station node (Node B), comprising:
    at least one processor with an associated memory, the memory including instructions executable by the at least one processor for performing the step of:
    reporting Fractional-Dedicated Physical Channel (F-DPCH) capability information of a local cell to a Radio Network Controller (RNC);
    receiving a radio link setup request message carrying F-DPCH information from the RNC; and
    allocating resources in accordance with the radio link setup request message for a user equipment (UE).

12. The Node B according to claim 11, wherein the the instructions for allocating resources further comprise:
    allocating F-DPCH and High Speed Downlink Packet Access (HSDPA) resources for the UE when the resource allocation instruction is a first instruction; and
    allocating Dedicated Physical Data Channel (DPDCH) and Dedicated Physical Control Channel (DPCCH) resources for the UE to bear signaling and data when the resource allocation instruction is a second instruction.

13. The Node B according to claim 11, wherein the instructions for reporting the F-DPCH capability information further comprises reporting the F-DPCH capability information of the local cell on receiving an audit message from the RNC.

14. The Node B according to claim 11, wherein the instructions for reporting the F-DPCH capability information further comprises reporting the F-DPCH capability information of the local cell through an audit response message.

15. The Node B according to claim 11, wherein the instructions for reporting the F-DPCH capability information further comprises reporting changed F-DPCH capability information to the RNC when the F-DPCH capability information of the local cell is changed.

16. The Node B according to claim 15, wherein the changed F-DPCH capability information is reported through a resource status indication message.

17. The Node B according to claim 15, wherein the memory further includes instructions executed by the at least one processor for performing the steps of:
    sending a radio link setup response to the RNC; and
    obtaining a downlink synchronization by using F-DPCH.

18. A Radio Network Controller (RNC) comprising:
    at least one processor with an associated memory, the memory including instructions executable by the at least one processor for performing the step of:
    obtaining Fractional-Dedicated Physical Channel (F-DPCH) capability information reported by a base station node (Node B);
    making a decision on resource allocation of the Node B in accordance with the F-DPCH capability information; and
    sending a radio link setup request message carrying F-DPCH information to the Node B.

19. The RNC according to claim 18, wherein the instructions for making the decision further comprise:
    instructing the Node B to allocate FDPCH and High Speed Downlink Packet Access (HSDPA) resources for an User Equipment (UE) in response to a Radio Resource Control (RRC) connection establishing request initiated by the UE when the reported F-DPCH capability information is capable.

20. The RNC according to claim 18, wherein the instructions for making the decision further comprise:

instructing the Node B to allocate Dedicated Physical Data Channel (DPDCH) and Dedicated Physical Control Channel (DPCCH) resources for the UE in response to the RRC connection establishing request initiated by the UE when the reported F-DPCH capability information is non-Capable.

* * * * *